INVENTORS
SHELDON A. PARKS
HOWARD J. NAESER though the attaching portion is so flexible and/or so subject to tear that it is necessary to employ mounting strips of metal or other rigid material for securing the sealing members in place. This is not only costly but also results in a number of other undesirable characteristics. Moreover, when the flexible material is a plasticized synthetic resin, contact thereof with styrene containing materials should be avoided.

United States Patent Office 3,378,956
Patented Apr. 23, 1968

3,378,956
EXTRUDED SEALING MEMBER
Sheldon A. Parks and Howard J. Naeser, Marietta, Ohio, assignors to The B. F. Goodrich Company, New York, N.Y., a corporation of New York
Filed Feb. 23, 1965, Ser. No. 434,385
8 Claims. (Cl. 49—485)

This invention relates to a member for effecting a seal between two relatively movable members one of which provides a closure for an opening in the other. More particularly, the invention relates to an elongated extrusion adapted to provide a seal between a wall member, adjacent an opening therein, and a closure member for that opening.

It is frequently necessary to provide a thermal and/or air barrier between a closure member for an opening and the portion of the cabinet or frame member adjacent the periphery of that opening. For example, the doors to refrigerators and other cabinets require a seal of this type and it is also now common to provide doors to buildings with threshold strips and edge seals to provide a barrier to the passage of air, moisture, and heat. Seals of this type, frequently called gaskets, are generally attached to one of the two relatively movable members, i.e., to the door or frame member, with a flexible portion positioned for engagement with the other member. The flexible portion may include a hollow chamber in which a flexible permanent magnet is provided to permit the closure member to serve both as a seal and as a holding means for the closure.

The aforementioned sealing members or gaskets for closures are now generally made of elastomeric material, such as synthetic or natural rubber or synthetic plastics, which are readily formed by extruding to provide a deformable portion and an integral attaching portion. Conventionally, these two portions may vary in thicknesses to provide different strength and flexibility but are formed of material of uniform composition throughout. Hence, the attaching portion is so flexible and/or so subject to tear that it is necessary to employ mounting strips of metal or other rigid material for securing the sealing members in place. This is not only costly but also results in a number of other undesirable characteristics. Moreover, when the flexible material is a plasticized synthetic resin, contact thereof with styrene containing materials should be avoided.

The principal object of this invention is, therefore, to provide an improved sealing member of the type described comprising an elongated one-piece extrusion having integral longitudinally extending portions of materials having different compositions with the portion adapted to be attached to one of two relatively movable members formed of a material which is not affected by contact therewith and/or is stiffer than the composition employed in the portion extending from the attaching portion for engagement by the other of the two relatively movable members, whereby the sealing member can be directly attached without the need of a separate fastening strip, clips or panels.

A further object of the invention is to provide a one-piece elongated extrusion formed entirely of synthetic plastic capable of having its stiffness reduced by the addition thereto of a plasticizer with the extrusion comprising a deformable portion adapted for sealing cooperation between two members to one of which the extrusion is attachable by a stiffer portion thereof with the said deformable portion containing a greater proportion of plasticizer than that in the portion of greater stiffness.

An additional object of the invention is to provide a one-piece elongated extrusion capable of providing a seal between a wall member adjacent an opening and a closure member for that opening characterized by the extrusion comprising an elongated strip-like attaching portion formed of a rigid plastic material and a deformable hollow sealing portion formed of flexible plastic material, the said attaching portion being adapted to be directly secured to one of the two members between which the seal is to be provided and dispose the said deformable portion in position for engagement by the other of said members.

A still further object of the invention is to provide an improved extrusion of the type defined in the preceding paragraph wherein the said hollow portion is provided with an elongated strip of flexible permanent magnetic material.

A still further object of the invention is to provide a sealing strip comprising a unitary extrusion of plastic material including an elongated strip-like portion from one face of which extends integral attaching means while from the other face extends an elongated integral hollow deformable body, the said hollow body having flexible walls while the said strip-like portion is formed of rigid material.

Additional objects and advantages of the invention will be apparent from the following description of the presently preferred embodiment and certain modifications thereof described with reference to the accompanying drawings, forming a part of this application, and in which.

Figure 1:
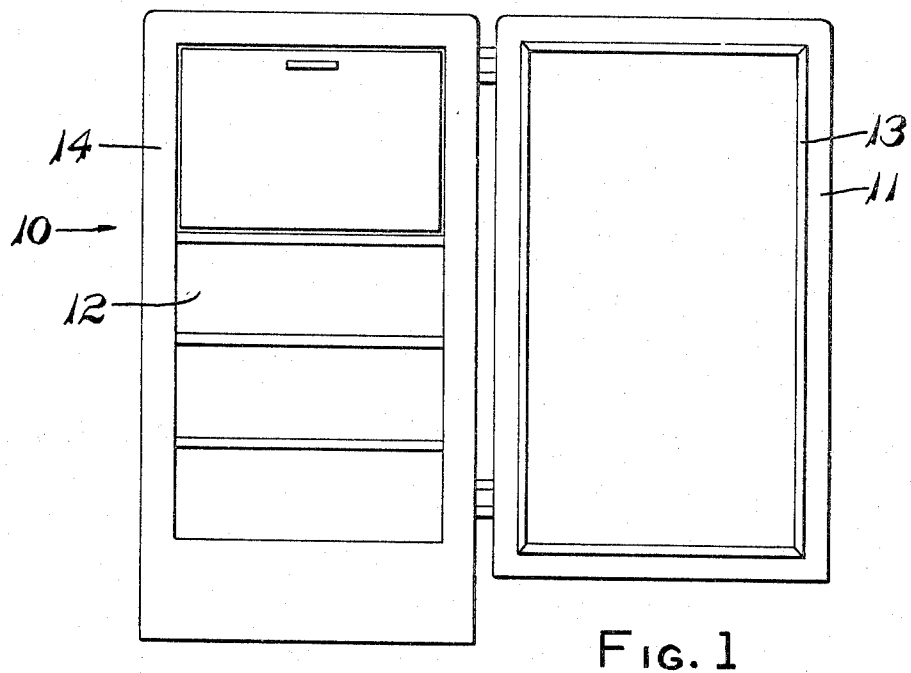
FIG. 1 is a somewhat schematic front elevational view of a refrigerator cabinet with the door in open position and provided with a sealing member formed in accordance with this invention.

A refrigerator cabinet is exemplary of one structure in which it is necessary to provide a seal between two relatively movable members and in which the sealing member is most conveniently formed by extrusion. As shown in FIGURE 1, a refrigerator 10 has a door 11 hinged thereto for closing the cabinet opening 12. The door 11 has a sealing member or gasket 13 secured thereto in a generally rectangular configuration and in a location to contact the wall member 14 of the cabinet surrounding the opening 12 to provide a seal therebetween when the door is closed. The sealing member or gasket 13 is initially formed as an elongated extrusion which is then cut into appropriate lengths and joined into the rectangular, frame-like configuration. Heretofore, the gasket has been secured to the door by separate rigid strips, plates or panels formed of metal or synthetic resin. This type of fastener, in addition to the cost of the fastening strips, has the further disadvantage of requiring a length of time for installing the gasket which is disproportionate to other cabinet assembling operations. Moreover, the fasteners have frequently caused undesirable deflections of the gaskets, especially in the region immediately adjacent the fastening means. In some cases these distortions have interfered with proper sealing action and, in any event, have introduced strains which were frequent causes of ultimate gasket failure. Furthermore, the use of styrene or other resin door liners or panels in contact with the gaskets has frequently caused difficulties due to bleeding of the plasticizer from the gaskets.

In accordance with this invention these difficulties are overcome by the improved sealing means being made as a one-piece unitary extrusion of materials that have different compositions in different parts thereof, each appropriate to the function performed by the part. For example, the gasket may be made or formed of materials having different stiffnesses for samples thereof of like dimensions so that the portion of the gasket which is required to be flexible for ready deformation can have that function while the attaching portion may have sufficient rigidity that separate attaching strips or clips are not necessary for properly mounting the sealing member in place. Thus, the attaching portion may have such a stiffness that it can be directly secured by nails, screws, or other fasteners extending therethrough or by integral spring-like projections received in openings of the member to which the sealing strip is attached. This not only eliminates the need for special attaching strips, clamps and fasteners, but also reduces the time required for mounting of the sealing member. Furthermore, it provides a more effective seal with less possibility of distortion and/or damage such as that caused by the heretofore employed separate fastening elements. Also, the portion of the gasket in contact with a styrene-containing member may be devoid of plasticizer thereby preventing the difficulties caused by plasticizer bleeding which have heretofore resulted when conventional flexible plastic gaskets have been used.

Figures 2, 3:
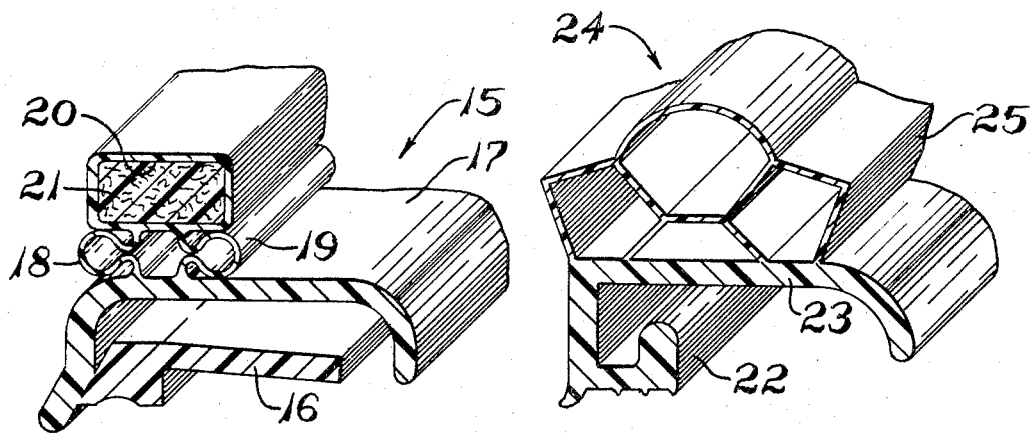
FIG. 2 is an enlarged fragmentary view, partially in perspective and partially in transverse section, illustrating the presently preferred embodiment of the sealing member embodying this invention.
FIG. 3 is a view similar to FIG. 2 illustrating another embodiment of the invention.

One form of sealing member or gasket embodying the invention is illustrated in FIG. 2 as a magnet-containing gasket 15 for use upon refrigerator cabinets in the manner of the gasket 13 shown in FIG. 1. The sealing member or gasket 15 is formed as a one-piece elongated extrusion including a strip-like attaching portion 16 which is preferably formed of a stiff material capable of having fastener openings formed therein for direct reception of screws, nails or the like. The attaching strip-like portion 16 is integrally united, adjacent one longitudinally extending edge, to a strip-like base portion 17 which extends in superposed relationship with respect to the attaching portion 16 and provides a cover thereover. The base portion 17 has a pair of flexible walls 18 and 19 extending longitudinally thereof and outwardly therefrom on the face opposite that which is adjacent the attaching portion 16. The walls 18 and 19 are of reversely curved configuration and have their portions which terminate on the base 17 spaced from each other and extending in parallel relationship to provide a somewhat bellows-like configuration between the base 17 and an elongated hollow compartment 20. The compartment 20, which is rectangular in cross section, is formed of flexible walls integrally united with the outer edges of the walls 18 and 19. Within the hollow compartment 20 is disposed a strip of flexible permanent magnetic material 21 which comprises finely-divided permanent magnetic particles, such as barium ferrite, united by an elastomeric binder.

The walls of the hollow compartment 20, the walls 18 and 19 which support the compartment upon the base portion 17, and the base portion itself are all preferably formed from a material of greater flexibility than that of the attaching portion 16. Preferably, the materials of different stiffness are formed from the same synthetic resin but contain differing amounts of plasticizer. By way of example, the material may be polyvinyl chloride with the attaching portion 16 formed of such material without plasticizer or with less plasticizer than the other portions of the gasket which are more flexible and contain plasticizer in sufficient quantity to impart the requisite flexibility.

One convenient manner of determining the proper degree of respective flexibility and stiffness for the deformable and attaching portions of the sealing member is by measuring the hardness of the extruded materials since flexibility is directly related to the hardness as measured by a durometer. Thus, it has been found that the required differences in flexibility for satisfactory operation of the several parts of the sealing member, in accordance with this invention, is achieved when the stiffer portion has a hardness within the range measurable by a type D Shore durometer whereas the part of the sealing member having the greater flexibility should have a hardness within the range measurable by a type A Shore durometer. More specifically, the stiffer portion of the extrusion preferably has a hardness reading of up to 80 on a type D Shore durometer and the material comprising the flexible portion of the gasket preferably has a reading of not less than 60, and preferably 70, on a type A Shore durometer. The values of 60 on the Shore scale A and 80 on the Shore scale D therefore represent the limits for the flexible and stiff portions. It is possible to employ a wide range of combinations of relative stiffness between those limits.

The extrusion comprising the improved sealing member can be made by known dual extruding equipment of the type employing two separate extrusion chambers feeding a common extrusion die with one of the extruders provided with the stiffer material and the other extruder provided with the more flexible material. By way of example but without limitation thereto, the portions of the die corresponding to the cross section of the sealing member having the greater flexibility can be fed by an extruder containing plasticized polyvinyl chloride while unplasticized polyvinyl chloride is fed by a separate extruder to a side opening in the die communicating with the portions of the passageway therein which define the part of the cross section of the sealing member that is stiffer. Hence, both the stiffer and more flexible materials issue from the die as a single integral strip which may be cut to desired length, mitered, and united into rectangular configuration for mounting upon a refrigerator door or other closure member as indicated in FIG. 1.

The invention is not limited to production of sealing members which are employed with magnets but may also be utilized for non-magnetic sealing members or gaskets for refrigerator and similar cabinets. One embodiment of such a gasket is shown in FIG. 3 as comprising an attaching portion 22 of elongated strip-like nature to one edge of which is integrally united a base portion 23 that is generally U-shape in cross section, both the attaching portion and the base portion being formed of stiff material. The side of the base portion 23, opposite that provided with the attaching portion 22, has a hollow body 24 extending longitudinally therealong which hollow body is formed of thin walls 25 of flexible material interconnected to provide a somewhat honeycomb cross section in which the hollow body 24 has a plurality of parallel, superposed, contiguous chambers separated by the interconnected walls 25. In this embodiment of the invention, the walls 25 of the hollow body 24 are formed of the more flexible material as, for example, plasticized polyvinyl chloride, whereas the base portion 23 and attaching portion 22 are formed of the stiff material which may, for example, be unplasticized polyvinyl chloride. Although both the attaching and base portions have been shown as formed of the same stiff material, it will be apparent that, if desired, the base portion 23 may be formed of the same flexible material as utilized in the walls 25 and the attaching portion 22 only be formed of the stiff material.

An extrusion of the type illustrated in FIG. 3 may be employed in a refrigerator cabinet, such as 10 of FIG. 1, by cutting the extrusion to appropriate lengths and joining these lengths in rectangular configuration similar to that shown for the gasket 13. Such a gasket can then be directly attached to the door 13 by inserting screws or similar fasteners directly through the attaching portion 22, by snapping the attaching portion into a suitable recess or opening, or by other means as will be understood by those skilled in the art.

Figure 4:
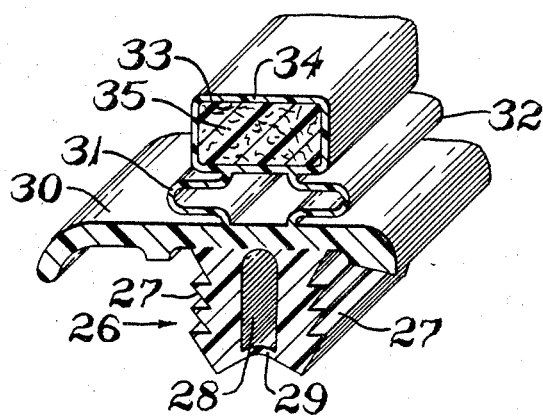
FIG. 4 is a view similar to FIG. 2 illustrating a further embodiment of the invention.

FIG. 4 illustrates another form of sealing member which may be employed as a gasket for the refrigerator 10 of FIG. 1. The gasket of FIG. 4 comprises an attaching portion 26 formed of a pair of longitudinally extending walls having longitudinally extending serrations 27 on the outer surfaces with the walls being spaced from each other by an opening therebetween, designated 28, the walls being reinforced adjacent their outermost edges by a transversely extending thin web 29. The attaching portion 26 is integral with and extends from one side face of the base portion 30 of the gasket, the other side of which portion has a pair of walls 31 and 32 attached thereto in parallel spaced relationship. The walls 31, 32 are flexible and provide a generally bellows-type configuration between the base portion 30 and a hollow chamber 33 extending longitudinally of the gasket and defined by flexible walls 34 integral with the outer ends of the walls 31 and 32. Within the hollow compartment 33 is an elongated strip of flexible magnetic material 35 which may be similar to the flexible magnet 21.

The attaching portion 26 of the sealing member illustrated in FIG. 4 is preferably formed of stiffer material than the base portion 30 and the walls 31, 32 and 34. If desired, however, the base portion 30 may, like the attaching portion 26, be made of the stiffer material and only the walls 31, 32 and 34 formed of the more flexible material. The extrusion illustrated in FIG. 4 may be cut to length and united into a gasket of rectangular configuration which can then be installed upon the cabinet door 11, without the need of additional fasteners, by simply forcing the attaching portion 26 into an appropriate groove or recess on the door 11. The gasket will be properly retained thereon by the serrations 27 engaging in the recess since the stiff material of the attaching portion 26, aided by its configuration, provides a spring-like action of its walls so that these may be forced into a recess and will be retained therein much in the manner of presently employed wire spring members for attaching gaskets and other objects. The composition of the stiffer portions of the gasket in FIG. 4 may be unplasticized polyvinyl chloride while the hollow body and flexible walls 31, 32 may be formed of plasticized polyvinyl chloride.

Figure 5:
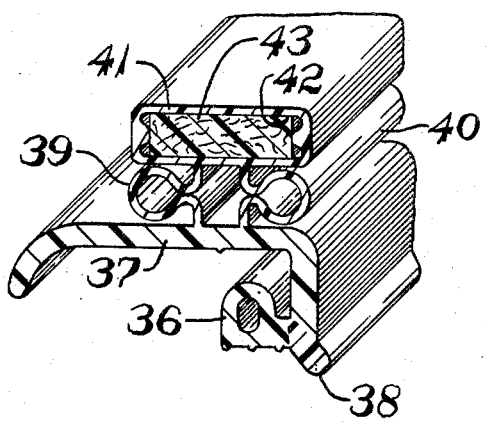
FIG. 5 is a view similar to FIG. 2 illustrating yet another embodiment of the invention.

FIG. 5 illustrates another embodiment of the invention which is adapted for use as a gasket for the door of a refrigerator or similar cabinet. In this embodiment, the gasket is formed of a one-piece elongated extrusion comprising the base portion 37 and attaching portion 36 which are similar in configuration to the base and attaching portions 23, 22, respectively, of FIG. 3. Likewise, the attaching and base portions of the extrusion shown in FIG. 5 may be formed throughout of stiff plastic material. Preferably, however, as indicated in FIG. 5, the attaching portion 36 is provided with a projecting rib 38 which is formed integrally therewith but is of a more flexible material than the remainder of the attaching portion 36 and the base portion 37.

The side of the base portion 37, opposite that provided with the attaching portion 36, has united therewith a pair of flexible walls 39 and 40 similar in configuration and function to the walls 18 and 19 of FIG. 2. The walls 39 and 40 are united with a wall portion 41, defining an elongated hollow chamber 42 which is generally rectangular in cross section and in which is disposed an elongated strip of flexible permanent magnet material 43. The extrusion shown in FIG. 5 may be employed as heretofore described to comprise a gasket for a refrigerator, such as 10. When so mounted, the sealing member is firmly held in place upon the cabinet door without distortion adjacent the fasteners and the sealing rib 38, being more flexible than the adjacent portions of the gasket, will readily deform into sealing engagement with the door.

The invention has been described primarily with reference to the use of plasticized and unplasticized polyvinyl chloride as the material for forming both the flexible and stiffer portions of the sealing members. It will be apparent, however, that the invention is not restricted to complete absence of plasticizer in the stiffer portions. Moreover, materials other than polyvinyl chloride may be employed. These materials should, however, be compatible so that when extruded together they remain united and do not separate nor have an inherent weakness at the regions of union. It is to be further understood that when reference has been made heretofore in the description, and hereinafter in the claim, to materials of different stiffness, the expression is intended to refer to materials which exhibit such difference when specimens of like dimension are compared as distinguished from the difference in stiffness which is exhibited by members due solely to their differences in cross-sectional configuration rather than their composition.

The embodiments of the invention which have been specifically illustrated and described are not inclusive of all forms in which the invention may be employed. Thus, it will be readily apparent that the principles of this invention may be utilized for sealing strips of other configurations as, for example, those having the shape of the attaching portion and/or the shape of the hollow body different from the configurations illustrated and described. Hence, it is to be understood that the invention is susceptible of adaptations and variations within the spirit and scope of the appended claims.

Having thus described the invention, we claim:

1. A one-piece elongated extrusion adapted to provide a seal between a wall member having an opening and a closure member for that opening, the said extrusion comprising integral longitudinally extending portions formed respectively of materials exhibiting different stiffness for samples thereof of like dimensions, the extrusion portion of greater stiffness comprising an attaching portion adapted to be attached to one of the two members and the portion of lesser stiffness including a hollow chamber a wall of which provides a sealing surface, and at least one flexible wall intermediate said attaching portion and hollow chamber supporting the latter in spaced relationship to the attaching portion and in a manner permitting movement of the hollow chamber relative to the attaching portion, the said extrusion being formed entirely of synthetic plastic capable of having its stiffness reduced by the addition thereto of a plasticizer, the portion of the extrusion of lesser stiffness having a greater proportion of plasticizer incorporated therein than the portion of greater stiffness.

2. An extrusion as defined in claim 1 formed throughout of polyvinyl chloride with only the said portion of the extrusion having the lesser stiffness containing plasticizer.

3. An extrusion as defined in claim 1 wherein the said portion of lesser stiffness has a durometer reading of not less than 60 on the Shore A scale while the portion of greater stiffness has a durometer reading of not over 80 on the Shore D scale.

4. A one-piece elongated plastic extrusion as defined in claim 1 wherein an elongated base portion is united to one edge of said attaching portion and extends in superposed spaced relationship thereto, and the said hollow chamber is one of a plurality of juxtaposed elongated hollow compartments integrally united to that side of said base portion opposite said attaching portion, both the said attaching and base portions being formed of the material exhibiting greater stiffness for a sample of given dimensions than a like sample of the material comprising the flexible walls.

5. A one-piece elongated plastic extrusion as defined in claim 1 wherein the said attaching portion includes a pair of parallel walls the outer sides of which are provided with longitudinally extending serrations.

6. A one-piece elongated extrusion of the type described adapted to provide a seal between a wall member adjacent an opening and a closure member for that opening, the said extrusion being composed of synthetic resin material in a configuration comprising an elongated base portion with an integral attaching portion formed of substantially unplasticized synthetic resin material disposed on one side of the base portion, flexible walls formed of plasticized synthetic resin material defining an elongated hollow compartment united to said base portion and extending longitudinally thereof on that side of said base portion opposite the attaching portion, and an elongated flexible permanent magnet in said hollow compartment, the substantially unplasticized material of said attaching portion exhibiting greater stiffness than a like dimensioned sample of the plasticized material forming the flexible walls of the hollow compartment.

7. A one-piece elongated plastic extrusion of the type described adapted to provide a seal between a wall member adjacent an opening and a closure member for that opening, the said extrusion comprising an elongated attaching portion adapted to be directly secured to one of said members, an elongated base portion united to one edge of said attaching portion and extending in superposed spaced relationship thereto, flexible walls defining an elongated hollow compartment, a pair of spaced flexible walls united to said base portion and the walls of said hollow compartment supporting the latter in spaced parallel superposed relationship upon said base portion, and an elongated flexible magnet in said compartment, the said attaching portion being formed of a composition exhibiting greater stiffness for a sample of given dimensions than a like sample of the composition comprising the flexible walls.

8. An extrusion as defined in claim 7 in which all portions are formed of polyvinyl chloride with the material comprising the said attaching portion having a reading of approximately 80 on a type D Shore durometer and the material comprising the said walls having a reading of approximately 70 on a type A Shore durometer.

References Cited

UNITED STATES PATENTS

| 2,427,513 | 9/1947 | Spessard | 260—32 |
|---|---|---|---|
| 2,908,949 | 10/1959 | Frehse | 20—69 |
| 2,949,651 | 8/1960 | Hill | 20—69 |
| 3,075,258 | 1/1963 | Petkwitz | 20—69 |
| 3,079,653 | 3/1963 | Cornell | 20—69 |
| 3,126,590 | 3/1964 | Monti | 20—69 |
| 3,137,900 | 6/1964 | Carbary | 20—69 X |
| 3,138,833 | 6/1964 | Neuman | 20—69 |
| 3,159,885 | 12/1964 | Cowles | 20—69 |
| 3,177,534 | 4/1965 | Millhouse et al. | 20—69 |
| 3,178,778 | 4/1965 | Reahard | 20—69 |
| 3,216,068 | 11/1965 | Williams | 20—69 |
| 3,238,573 | 3/1966 | Pease | 49—383 |

DAVID J. WILLIAMOWSKY, *Primary Examiner.*

HARRISON R. MOSELEY, *Examiner.*

P. C. KANNAN, W. E. HEATON, *Assistant Examiners.*